United States Patent Office

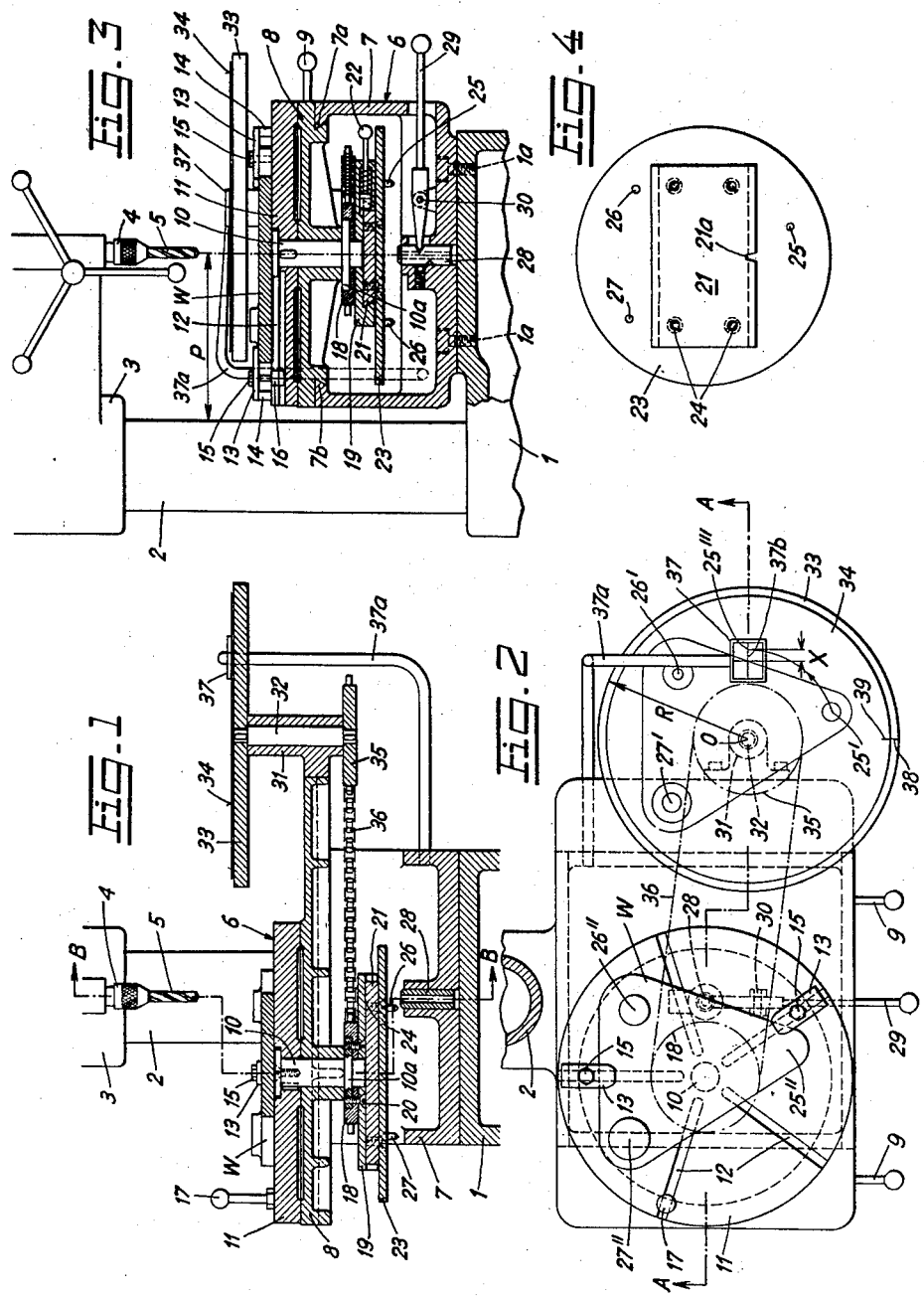

3,116,652
Patented Jan. 7, 1964

3,116,652
MACHINE TOOL FOR MACHINING HOLES
Albert Bregnard, Motiers, Neuchatel, Switzerland
Filed Oct. 18, 1961, Ser. No. 145,933
Claims priority, application Switzerland Oct. 24, 1960
2 Claims. (Cl. 77—5)

The present invention relates to machine tools for machining holes in a workpiece; such machine tool may be, for example, a boring machine, a fine-boring machine, a machine for rectifying holes, a machine acting by electric erosion or a shaping machine.

The invention relates more particularly to a machine tool of the kind comprising a tool-carrying spindle longitudinally movable in a direction perpendicular to the workpiece-bearing face of a table member capable of being freely moved in the plane of said face and means for accurately positioning said table member, and the workpiece secured thereto, successively in several work positions, such means including reference mark means on a template rigidly connected to the table member and means on a base member, operable to co-operate with the reference mark means.

The principal object of the invention is to provide for such machine-tools an arrangement which allows for enlarging the capacity of the same, i.e., the size of the workpieces which may be machined, for a given "overhang" (which is the distance from the axis of the tool-carrying spindle to a column or equivalent member which supports the head portion of the machine).

Other objects and features will appear hereinafter from the description of a preferred embodiment of the invention. This embodiment is represented by way of example in the accompanying drawings which are somewhat diagrammatic. In the drawings:

FIG. 1 is a front elevational view of the embodiment, partly in a vertical section taken along the broken line A—A of FIG. 2, FIG. 2 is a plan view corresponding to FIG. 1, the upper portion of the machine tool being however supposed to be broken away, FIG. 3 is a side elevational view corresponding to FIGS. 1 and 2, partly in vertical section along the broken line B—B of FIG. 1, and FIG. 4 is a plan view of a template and of a part by means of which same is mounted in the machine.

The machine tool represented in the drawings is a boring machine comprising a base member 1 which may be fixed or movable in vertical direction. The frame of the machine comprises a column 2 and a head 3. A spindle 4 carrying a boring tool 5 is mounted in the head for rotation and for movement in the direction of its vertical axis of rotation. The means for rotating the spindle 4 are not represented; the vertical movement of the spindle may be carried out by hand or by motor means, which are also not represented. In other types of machine tools with which the invention is concerned, the tool may be a fine boring tool, a tool for threading holes, a tool for rectifying holes or a milling tool for shaping. The spindle might, in a further modification, be non-rotatable and arranged in a conventional manner for machining holes by electric erosion.

The reference numeral 6 designates a table assembly including a body 7 secured to the base member 1 by means of screws 1a. This body 7 has the general form of a thong; the upper rim portions of its longitudinal walls constitute a pair of longitudinal guides 7a, 7b (FIG. 3) the cross section of which has the form of a swallow's tail. These guides support a slide 8 which is provided with handles 9 for its manual displacement in the horizontal direction of the guides 7a, 7b. The slide 8 has a vertical bore which aligns with the axis of the tool-carrying spindle 4, when the slide 8 approaches its right side end position (FIGS. 1 and 2). An axle 10 is mounted for rotation in this bore. A workpiece-supporting member 11 secured to the upper end portion of this axle 10 is supported for rotation on annular bearing surfaces provided at the top of the slide 8. Of course, annular rows of balls or of other antifrictional bearing means might be interposed between the slide 8 and the table member 11 in order to facilitate the rotation of the latter. In a similar manner the axle 10 might be mounted for rotation by means of antifriction bearings. The table member 11 has in its upper face five radial grooves 12 which are uniformly distributed and which have in cross-section the shape of an inverted T. The reference numeral W designates a workpiece which is secured to the table member 11 by known means which may be, for example, clamps 13, struts 14, screw bolts 15 and sliding blocks introduced in the grooves 12 and having threaded holes engaged by the screw bolts 15. The rotary movement of the table member 11 with the workpiece and with the shaft 10 may be effected manually by means of handles as for example the handle 17 which is removably secured to the table member 11. If the latter is intended to support heavy workpieces, the displacement of the slide 8 and/or of the table member 11 may be carried out by motor means of known design which are not represented on the drawings.

A chain wheel 18 and a holding member 19 are secured to a flange 10a of the axle 10 by means of screws 20. The holding member 19 has on its lower side a longitudinal guide groove with a cross section in the form of a swallow's tail which groove holds an auxiliary slide 21. A bolting device 22 is provided on the holding member 21 to lock the auxiliary slide 21 in its position of use; this bolting device may comprise, for example, a sliding spring-loaded bolt intended to engage a notch 21a (FIG. 4) provided in the auxiliary slide 21.

A plate 23 which hereinafter will be termed "template" is secured to the auxiliary slide 21 by means of screws 24 (FIG. 4). This template is provided with reference mark means which in the example represented in the drawings are constituted by cylindrical pins 25, 26, 27 having pointed ends and protruding from the lower face of the template; the disposition of these pins corresponds exactly to the disposition of the holes to be machined in the workpiece W secured to the table member 11.

The bottom of the body 7 of the table assembly 6 has a central vertical bore, the longitudinal axis of which is exactly aligned on the vertical axis of the tool-carrying spindle 5; this bore guides a bolt 28 of a bolting device pertaining to means operable to co-operate with the above-mentioned reference mark means to fix the table member and workpiece in different positions relative to the axis of the tool-carrying spindle 4. In the example shown, the bolt 28 has a longitudinal central bore with exactly the same diameter as the pins 25, 26, 27; this bolt is operatively connected, as shown in FIG. 3, with a hand lever 29 pivotally mounted at 30 on lugs of the bottom of the body 7. The up and down movements of the bolt 28 might be effected by other known means, which may be hydraulic or pneumatic for example. When the bolt 28 occupies its lower end position as shown in FIGS. 1 and 3, it does not engage any one of the pins 25, 26, 27 and consequently the slide 8 is free to move lengthwise and the rotatable assembly constituted by workpiece W, the table member 11, the axle 10, the holding member 19, the auxiliary slide 21 and the template 23 may be freely rotated.

It is clear that the pins 25, 26, 27 which constitute the reference mark means, and also the bolt 28 and the bore in which it is guided should be machined to a high degree of precision. It is also obvious that the pins might be replaced by holes in the template or in sleeves press-fitted into holes of the template. In these two modifications the bolt 28 would not have a central bore, but an upper cylindrical end portion having exactly the diameter of the holes in the template or in the sleeves thereof.

A bearing 31 is provided at one of the ends of the slide 8; it mounts for rotation a shaft 32 to the upper end of which is secured a pattern-carrying table 33. This table, the centre of which is indicated at O in FIG. 2 and the outer radius of which is designated with R, is fitted with non-represented means for holding fast a drawing sheet 34 or another pattern which might be constituted by a model workpiece on which the centres of the holes to be machined in the workpiece W would be represented by crosses or by holes of small diameter.

A chain wheel 35 is secured to the lower end portion of the axle 32 at the same level as the chain wheel 18 which has the same diameter. The two chain wheels are operatively connected to each other by a chain 36. It is thus obvious that the workpiece-carrying table 11 and the pattern-carrying table 33 are connected for rotation with each other; since they are mounted both on the same slide 8, they will also move bodily with this slide 8.

It is clear that the tables 11 and 33 might be connected for rotation by other means, for example by means of a train of toothed wheels or of a device comprising wheels and cables or steel bands. It is also evident that the tables 11 and 13 need not be of circular form as represented.

An indicating means 37 located above the pattern-carrying face of the pattern-carrying table 34 is rigidly secured to the table assembly 6 by means of a rod 37a. In the example shown on the drawings, this indicating means comprises a rectangular frame and two fine wires extending at right angles to each other to mark a centre which coincides with the centre O of the pattern-carrying table 33 when the axis of rotation of the workpiece-carrying table 11 coincides with the axis of rotation of the tool-carrying spindle 4. One of the said wires, designated with 37b, extends parallelly to the direction of movement of the slide 8. In a modification the indexing means might comprise a glass plate having engraved thereon two orthogonal lines replacing the above mentioned wires. In a further modification the indexing means might be simply constituted by a pointed end of the rod 37a. In still a further modification the indicating means might comprise a device capable of projecting on the drawing 34, upwardly or downwardly, a luminous cross or simply a light spot.

Obviously there is a correspondence in the disposition of the pins 25, 26 and 27 (or of equivalent reference mark means) on the template 23 with that of the centres 25', 26' and 27' (FIG. 2) indicated on the drawing 34 (or on an equivalent pattern secured to the table 33) and that of the centres 25", 26" and 27" of the axes of the holes to be machined in the workpiece W.

As shown in FIG. 2, the table 33 and the drawing 34 are provided with indices 38 and 39, respectively, which are used to match the drawing 34 with regard to the template 23.

The manner of use and of operation of the machine tool of the invention is as follows:

After having put in place the template 23 and the drawing 34 in their position of use, the worker puts in the correct position the workpiece W with the aid of auxiliary means which are not represented. These means may for example consist of rules and abutments that the worker puts in place with the aid of a model workpiece or of a holding plate adapted to the workpiece W, in a manner which is known from the work on machine tools of the similar kind. The workpiece is then fastened to the table 11 with the already mentioned means 13, 14, 15, 16 and the tool 5 is clamped in the spindle 4. The worker then rotates the workpiece-carrying table 11 by means of the handle 17, whereby the pattern-carrying table 33 is rotated by the same angle. This rotation is continued until one of the centre marks chosen on the drawing, for example, the centre mark 25', is located at 25''' below the wire 37b of the indicating means 37, at a distance X from the centre of this means. The worker then shifts by hand the slide 8 by the amount X so that the centre mark 25' finally will be located at least approximately below the centre of the indicating means 37. This means that the reference mark pin 25 and the centre 25" of the hole to be machined will be located in alignment with the common axis of the bolting member 28 and of the tool 5. The worker then lowers the hand lever 29 and thereby engages the bolting member 28 with the index mark pin 25, thereby positioning exactly the workpiece W and holding the same in this desired position for the subsequent machining of the hole that has the centre 25". This hole may then be machined and thereafter the movable assembly 8, 11, 23, 33 may be freed by raising the hand lever 29. The same procedure may be adapted for positioning the workpiece previous to the machining of each of the other holes in the workpiece W.

More generally, the centre mark of any hole may be brought below the indicating wire or line 37b of the indicating means 37 and then below the centre of this means. It will thus be sufficient to impart to the slide 8 a displacement at most equal to the radius R for attaining any point on the workpiece-supporting table 11. This advantage results from the fact that the positioning action is effected implicity by means of polar co-ordinates although the templates may be realised by means of cartesian co-ordinates, which are simple and current in the mechanical industry.

A further important advantage of the invention consists in that it enlarges considerably the capacity of the machine, as expressed in terms of the dimensions of the workpieces which may be machined, for a given value of the overhang p (FIG. 3). In fact, with a work-supporting table of the generally used kind having cross-slides, mounted on a boring machine having an overhang p, the capacity in the transversional direction (in the plane of FIG. 3) is at most equal to p. In the construction according to the invention, this capacity is effectively equal to 2p, despite the absence of any transversal slide. The importance of this advantage is emphasized by the fact that a machine equipped with a work-supporting table of the cross slide type having a transversal capacity equal to 2p will undergo, for a determined force, a flexional deformation which is 8 times as great as the flexional deformation of a machine of equal capacity, constructed according to the invention, because the flexional deformations are proportional to the cube of the overhang.

A machine according to the invention is thus particularly well fitted to the machining of large workpieces; it should furthermore be retained that the worker may remain always about at the same distance from the tool-carrying spindle, whereas this is not so when he works on machines having a transversal slide and more particularly on machines having a table of the cross-slide type.

If the template is fitted with reference mark means (pins) other than those necessary for the machining of the workpiece given as example, such means would simply remain unutilised during the machining of the workpiece. Since the use of the preferred embodiment of the machine according to the invention is bound to the use of a drawing or other pattern of the workpiece, it will thus be possible to use one single template not only for the machining of several indentical workpieces, but also for the machining of several series of workpieces differing from each other, and this will not imply the risk of an error. Practically a template may be fitted with several hundreds reference mark pins or holes for the machining of a very great number of workpieces differing from each other.

If the machine according to the invention is intended for machining very large workpieces, the pattern-carrying table may be disposed in a different manner in order to reduce the overall dimensions of the whole assembly and to render the use more easy. For example, the drawing and the table which carries the same may be disposed for rotation about an horizontal axis so that the pattern-carrying face of the table is vertical, the operative connection of the drawing with the work-carrying table 11 being realised in such a manner that the rotary movements and the translatory movements of the members 11 and 33 are synchronised quite in the same manner as in the embodiment which has been described with reference to the drawings.

Other dispositions will also allow for a reduction of the overall dimensions of the construction. It is, for example, possible to use a drawing established at a reduced scale, if the indicating means is made to move in the same direction as the slide 8 in a proportion reduced at the same scale as the drawing. Thus, if the drawing is established at the scale 1:2, the displacements of the indicating means would always be half so great as those of the slide 8; for realising these conditions it will be sufficient to interpose an appropriate demultiplicating mechanism between the slide and the indexing means.

In another modification of reduced overall dimensions the drawing or equivalent pattern may be fastened on a table rotatable about a fixed axis, whilst the indicating means would be rigidly connected to the slide; in this modification, an appropriate mechanism would realise the synchronism of the two tables and the drawing would be established so that the concordance between the workpiece and the drawing would subsist. In this modification too, the drawing might be established at a reduced scale and the indexing means be moved relatively to the slide.

Many other modifications of detail might be made within the scope of the present invention.

Manifestly the invention finds its useful applications not only on a boring machine, but also on various other machine tools, as has been mentioned in the introduction of the present description.

I claim:
1. A machine tool for machining holes in a workpiece comprising a base member, a tool-carrying spindle, means mounting the spindle above the base member with its axis vertical and for vertical movement, a slide, means slidably mounting the slide on a fixed portion of the base member for movement beneath the tool-carrying spindle in one horizontal direction relative to the base member and relative to the tool-carrying spindle, said slide having a first vertical bore, an axle mounted for rotation in said bore, a workpiece-carrying table member secured to said axle and supported for rotation therewith on said slide, means for securing a workpiece on the table member, a template rigidly connected to said axle and having reference mark means positioned correspondingly to the holes to be machined in the workpiece, and means on the base member operable to co-operate with the reference mark means to fix the table member and workpiece in different positions relative to the tool-carrying spindle, said slide having a second vertical bore spaced from said first vertical bore, a second axle mounted for rotation in said second bore and connected with said previously cited axle for rotation therewith, a pattern carrying table secured to said second axle and having a pattern carrying face, and an indicating means located opposite said pattern carrying face to cooperate with a pattern mounted on this face to indicate the relative position of a workpiece secured to said table member with the axis of said tool carrying spindle.

2. A machine tool for machining holes in a workpiece comprising a base member with a body having the general configuration of a trough with oppositely disposed longitudinal walls fixed to said base, a tool carrying spindle, vertical column means and head means mounting the spindle above the body with its axis vertical and for vertical movement, an elongated transversely extending slide, guide means on top of said body for receiving said slide, said slide being disposed on said guide means for freely slidable movement beneath said tool carrying spindle and above said body in a horizontal straight line direction only, and being disposed on said guide means so the longitudinal axis of said elongated slide always remains the same distance from said column means and in vertical alignment with the vertical axis of said spindle, said slide having an elongated vertical bore extending into said trough with a vertical axle freely rotatably mounted in said bore, said bore being disposed in alignment with the longitudinal axis of said slide and mounted adjacent one end of said slide, a substantially horizontally extending workpiece carrying table member fixed to the upper end of said axle for rotation with respect to said slide, said freely rotatable table being disposed above said slide and outside of said trough, means for securing a workpiece on top of said table member, a template rigidly secured to the lower end of said axle below said slide and disposed within said trough and having reference mark means positioned thereon corresponding to the holes to be machined in the workpiece, and means on the body and within said trough to fix the table member and workpiece in different positions with respect to said tool carrying spindle.

References Cited in the file of this patent

UNITED STATES PATENTS

| | | |
|---|---|---|
| 1,396,302 | Wagner | Nov. 8, 1921 |
| 2,874,599 | Charlat | Feb. 24, 1959 |
| 2,946,247 | Lassy | July 26, 1960 |

FOREIGN PATENTS

| | | |
|---|---|---|
| 863,437 | Germany | Jan. 19, 1953 |